US008646348B2

(12) United States Patent
Hung

(10) Patent No.: US 8,646,348 B2
(45) Date of Patent: Feb. 11, 2014

(54) ELECTRIC PUSH ROD AND RELEASE MECHANISM COMBINATION STRUCTURE

(75) Inventor: Chih-Li Hung, New Taipei (TW)

(73) Assignee: MOTECK Electric Corp., New Taipei (TW)

( * ) Notice: Subject to any disclaimer, the term of this patent is extended or adjusted under 35 U.S.C. 154(b) by 245 days.

(21) Appl. No.: 13/248,889

(22) Filed: Sep. 29, 2011

(65) Prior Publication Data
US 2012/0096963 A1   Apr. 26, 2012

(30) Foreign Application Priority Data

Oct. 25, 2010  (TW) ............................... 99220594 U

(51) Int. Cl.
| | |
|---|---|
| F16H 1/24 | (2006.01) |
| F16H 55/02 | (2006.01) |
| F16H 3/06 | (2006.01) |
| F16H 27/02 | (2006.01) |
| F16H 29/02 | (2006.01) |
| F16H 29/20 | (2006.01) |

(52) U.S. Cl.
USPC ..................................... 74/89.38; 74/424.78

(58) Field of Classification Search
USPC ............ 74/89.14, 89.23, 89.34, 89.37, 89.38, 74/89.39, 412 TA, 424.71, 424.78, 425, 74/435; 5/610, 613, 616, 617, 618; 192/101, 129 A, 129 R, 55.1, 138, 192/142 R, 144, 150, 202
See application file for complete search history.

(56) References Cited

U.S. PATENT DOCUMENTS

| | | | | |
|---|---|---|---|---|
| 5,233,879 | A | * | 8/1993 | Watanuki et al. ............... 74/425 |
| 5,329,657 | A | * | 7/1994 | Bartley et al. .................... 5/617 |
| 6,079,287 | A | * | 6/2000 | Nagata ......................... 74/89.39 |
| 2006/0081079 | A1 | * | 4/2006 | Jaecklin et al. .............. 74/89.23 |
| 2006/0243075 | A1 | * | 11/2006 | Liou et al. .................... 74/89.39 |
| 2009/0044646 | A1 | * | 2/2009 | Duck et al. ................... 74/89.39 |
| 2009/0288511 | A1 | * | 11/2009 | Kuribayashi et al. ........ 74/89.38 |
| 2010/0139429 | A1 | * | 6/2010 | Ku ............................... 74/89.37 |

* cited by examiner

Primary Examiner — Troy Chambers
Assistant Examiner — Jake Cook
(74) Attorney, Agent, or Firm — Muncy, Geissler, Olds & Lowe, PLLC

(57) ABSTRACT

An electric push rod and release mechanism combination structure includes an electric push rod assembly using a coupling for connection to movable frame parts of equipment and a motor to rotate a transmission screw rod through a reducing gear set in moving a retractable tube set between an extended position and a received position, and a release mechanism consisting of a mounting socket, a connection socket, a torsion spring, a clutch module and an operating device and connected between the retractable tube set and the coupling of the electric push rod assembly for operation by a user to release the retractable tube set from the coupling safely with less effort.

10 Claims, 10 Drawing Sheets

ELECTRIC PUSH ROD AND RELEASE MECHANISM COMBINATION STRUCTURE

This application claims the priority benefit of Taiwan patent application number 099220594 file on Oct. 25, 2010.

BACKGROUND OF THE INVENTION

1. Field of the Invention

The present invention relates electric push rod design for use in an electric bed, massage chair, exercising machine, physical therapy equipment or the like to move movable component parts and more particularly, to an electric push rod and release mechanism combination structure, which uses a release mechanism consisting of a mounting socket, a connection socket, a torsion spring, a clutch module and an operating device for operation by a user to release the retractable tube set of the electric push rod from the movable component parts of the equipment safely with less effort.

2. Description of the Related Art

An electric push rod is adapted for use in an electric bed, massage chair, exercising machine, physical therapy equipment or the like to move movable component parts in lifting a person or load carried thereon, or biasing the angle of the person or load.

An electric push rod for this purpose generally comprises a retractable tube set, a motor operable to move the retractable tube set between an extended position and a received position, and a clutch mechanism operable to disengage the retractable tube set from the equipment in which the electric push rod is installed for enabling the retractable tube set to be retracted rapidly. However, the clutch mechanism cannot control the retracting speed of the retractable tube set. When the retractable tube set is retracted rapidly to lower the person or load carried on the movable component parts of the equipment, the person or load carried on the movable component parts of the equipment may feel uncomfortable, or the load may be impacted, causing damage.

FIG. 10 illustrates an electric push rod release control mechanism according to the prior art. This design comprises a first socket A connected to a retractable tube set D1 of an electric push rod D, a second socket B movably attached to the first socket A, a coupling D2 fastened to the second socket B and connectable to a movable frame part of an external equipment (electric bed, massage chair, physical therapy equipment, etc.), and a clutch module C mounted at the second socket B. The clutch module C comprises a barrel C, a first ring member C2 and a second ring member C3. If the user does not release the second ring member C3, the stop block C31 of the second ring member C3 will be stopped at the flange C11 of the barrel C1. At this time, the first ring member C2 and the second ring member C3 clamp the barrel C against movement. Subject to engagement between the protruding portions C12 of the barrel C1 and the recessed portions B1 of the second socket B, the retractable tube set D1 can move the coupling D2 and the movable frame part of an external equipment.

When released the second ring member C3, the second ring member C3 is separated from the first ring member C2 to disengage the stop block C31 from the flange C11 of the barrel C1. At this time, the retractable tube set D1 can be retracted, allowing the movable part of the external equipment to be lowered rapidly. If the movable part of the external equipment carries a person or heavy load, the person or heavy load will accelerate the lowering speed of the movable part of the external equipment, threatening the user or the person carried on the movable part of the external equipment, or causing the load to be impacted or damaged. Thus, an improvement in this regard is necessary.

SUMMARY OF THE INVENTION

The present invention has been accomplished under the circumstances in view. It is the main object of the present invention to provide an electric push rod and release mechanism combination structure, which enables the electric push rod to be released from the movable frame parts of the external equipment and retracted smoothly, assuring a high level of safety and avoiding accidental injury or damage.

It is another object of the present invention to provide an electric push rod and release mechanism combination structure, which allows adjustment of the operating angle of the operating device that controls release of the retractable tube set of the electric push rod.

It is still another object of the present invention to provide an electric push rod and release mechanism combination structure, which does not occupy any internal space of the electric push rod, saving installation space and cost and facilitating the fabrication.

To achieve these and other objects of the present invention, an electric push rod and release mechanism combination structure comprises an electric push rod assembly and a release mechanism. The electric push rod comprises a housing having an accommodation chamber defined therein, a reducing gear set accommodated in the accommodation chamber of the housing, a drive unit adapted for rotating the reducing gear set, a transmission device comprising a transmission screw rod coupled to and rotatable by the reducing gear set, a retractable tube set mounted on the transmission screw rod and retractable linearly relative to the housing upon rotation of the transmission screw rod, and a coupling disposed at an outer side relative to the retractable tube set. The release mechanism is connected between the retractable tube set and the coupling of the electric push rod assembly, consisting of a mounting socket, a connection socket, a torsion spring, a clutch module and an operating device. The mounting socket is fastened to the distal end of the inner tube of the retractable tube set remote from the nut. The connection socket is movably received in the mounting socket and connectable to the coupling. The torsion spring is mounted around the mounting socket and the connection socket to hold down the mounting socket and the connection socket. The clutch module is mounted on the mounting socket, comprising a first ring member having an actuating portion and rotatable to expand the torsion spring and to further release the mounting socket and the connection socket from the constraint of the torsion spring, a second ring member movably capped onto the first ring member and having a side opening, a lug fixedly located on the periphery of the second ring member around the side opening of the second ring member, an operating device, which comprises an operating handle pivotally connected to the lug and a driving member suspending in the side opening inside the lug and connected to the operating handle and engaged with the actuation portion of the first ring member and movable by the operating handle to rotate the first ring member, and a stop member adapted for limiting the angle of rotation of the operating device relative to the second ring member and the lug.

Further, the lug comprises engagement means disposed at a border edge of one side thereof, an arched locating groove located on an opposite side thereof. Further, the stop member comprises an engagement portion disposed at one lateral side of one end thereof and detachably engaged with the series of teeth of the lug, a countersunk hole disposed at an opposite lateral side of the same end thereof and kept in communication with the arched locating groove of the lug, and a tightening up screw threaded into the countersunk hole and tightly engaged into the arched locating groove to lock the stop member to said lug. By means of loosening the tightening up screw, the user can adjust the angular position of the stop member relative to the lug.

DETAILED DESCRIPTION OF THE PREFERRED EMBODIMENT

Figure 1:
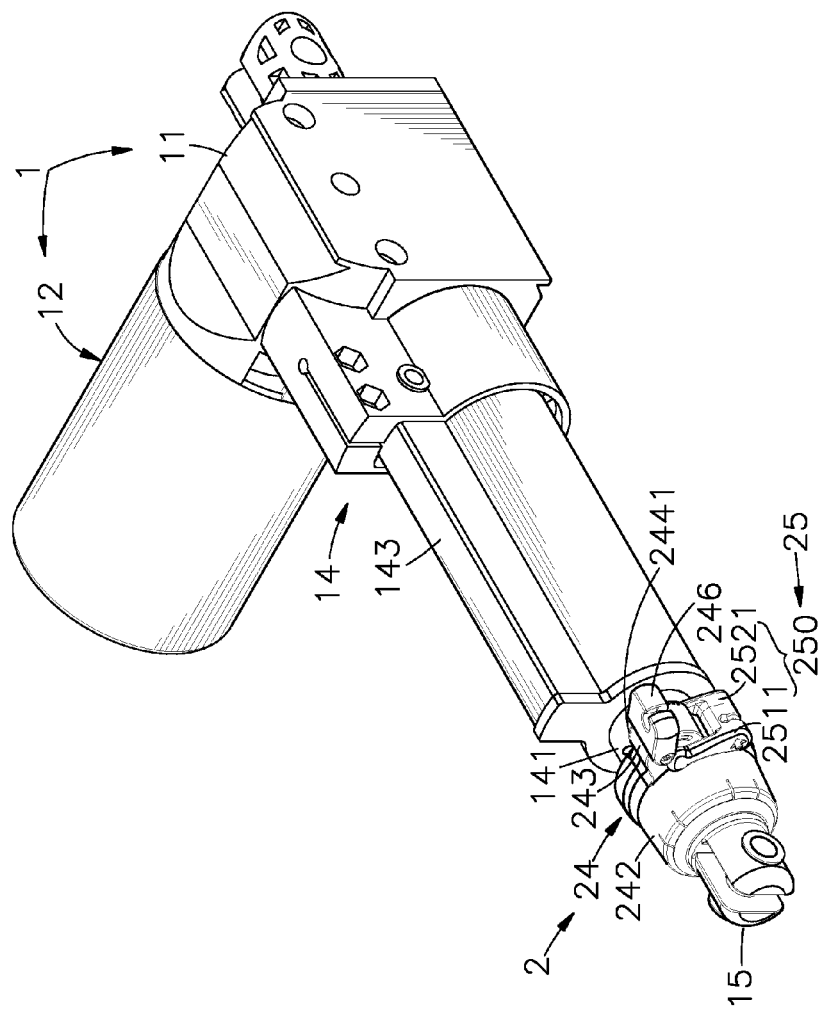
FIG. 1 is an elevational view of an electric push rod and release mechanism combination structure in accordance with the present invention.
Figure 2:
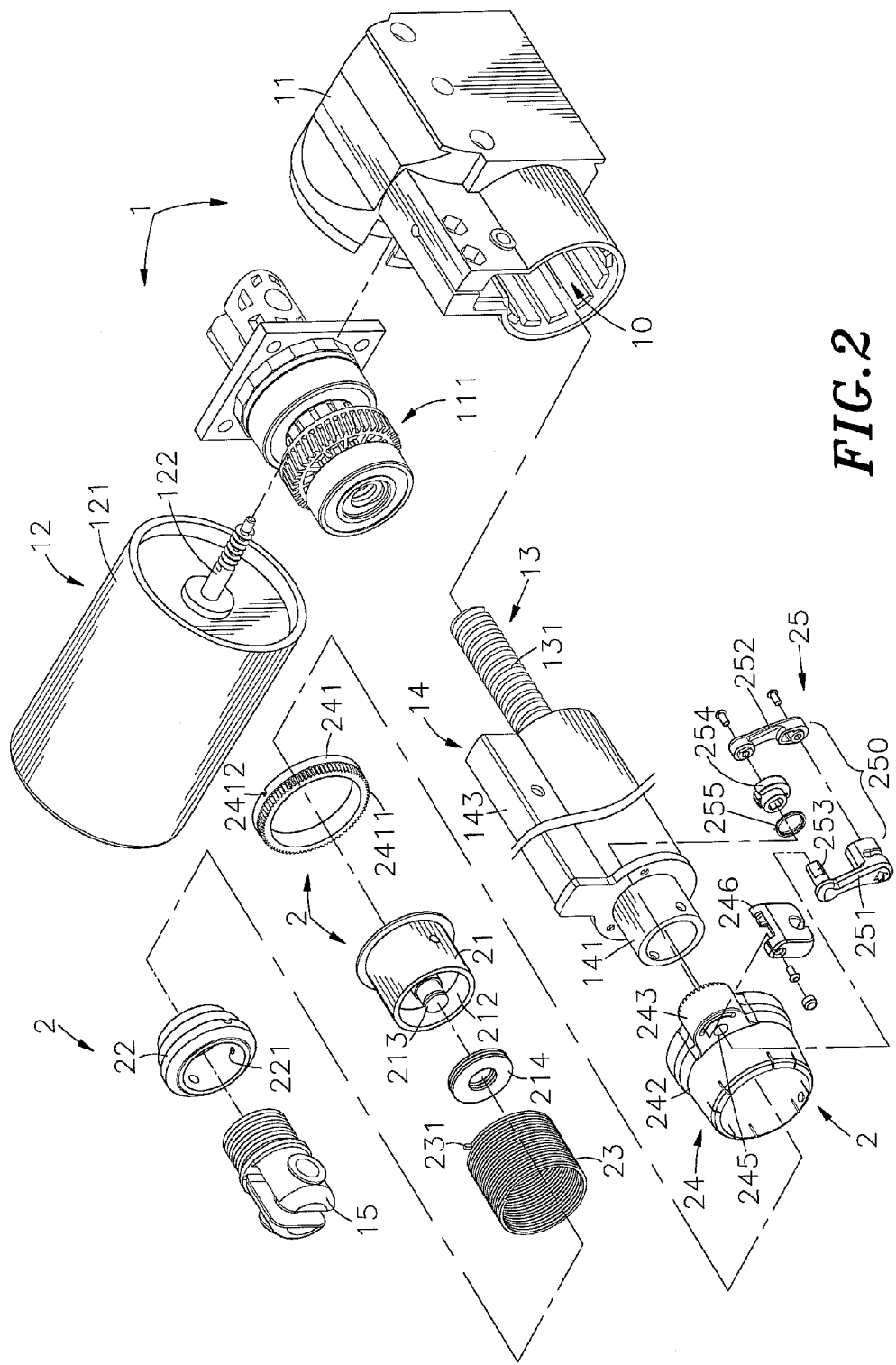
FIG. 2 is an exploded view of the electric push rod and release mechanism combination structure in accordance with the present invention.
Figure 3:
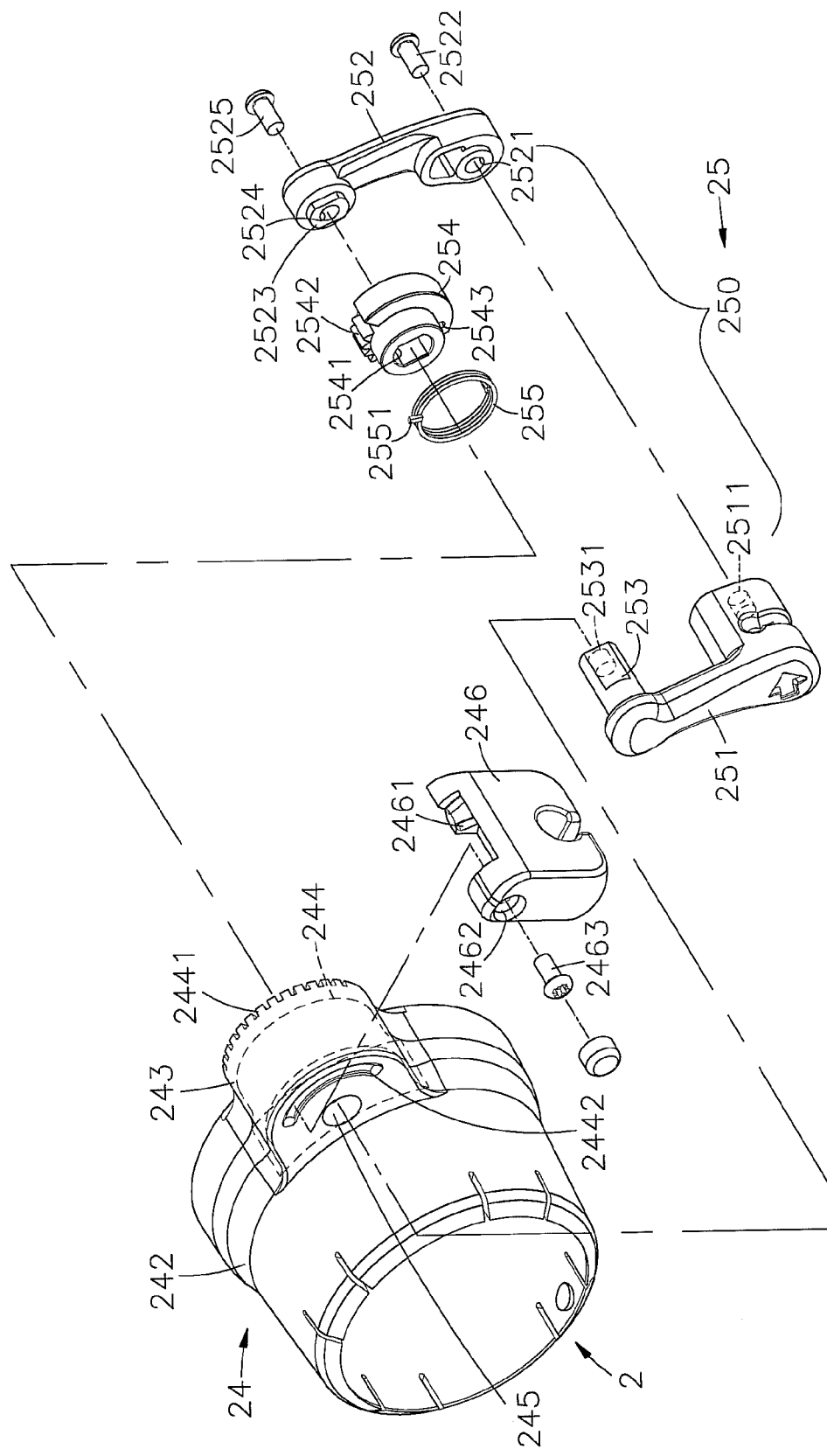
FIG. 3 is an enlarged view of a part of FIG. 2.
Figure 4:
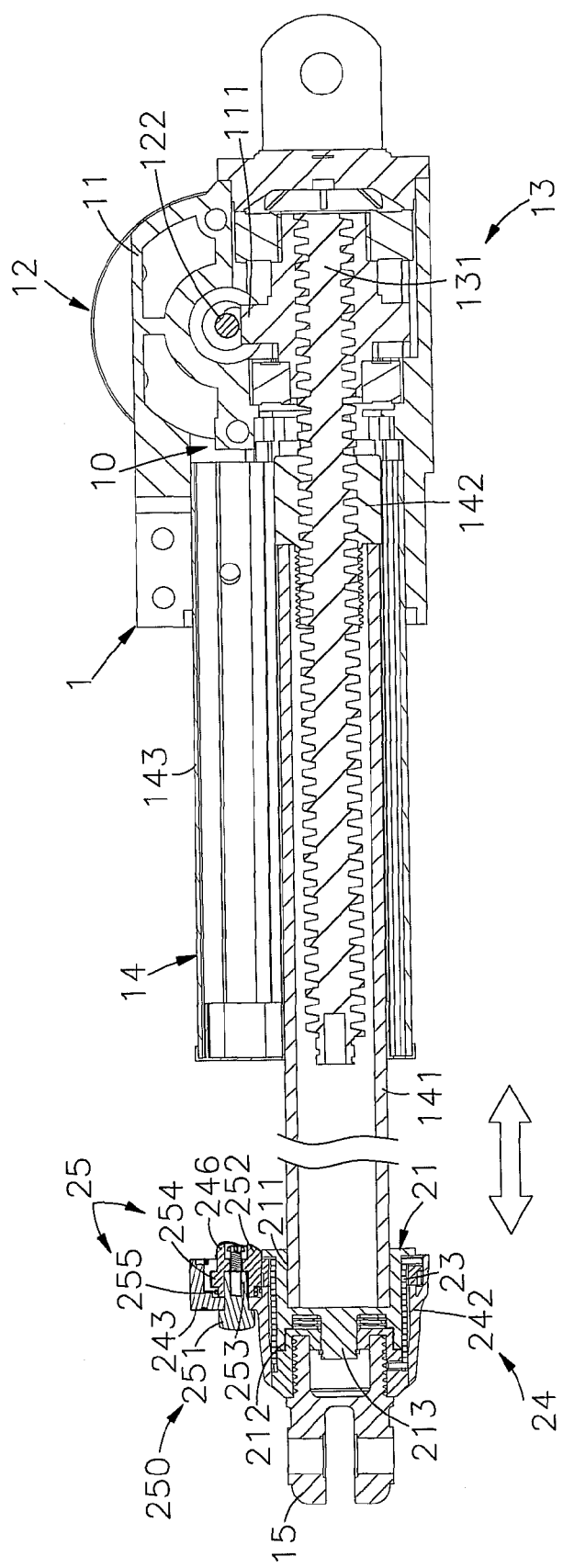
FIG. 4 is a sectional side view of the electric push rod and release mechanism combination structure in accordance with the present invention.
Figure 5:
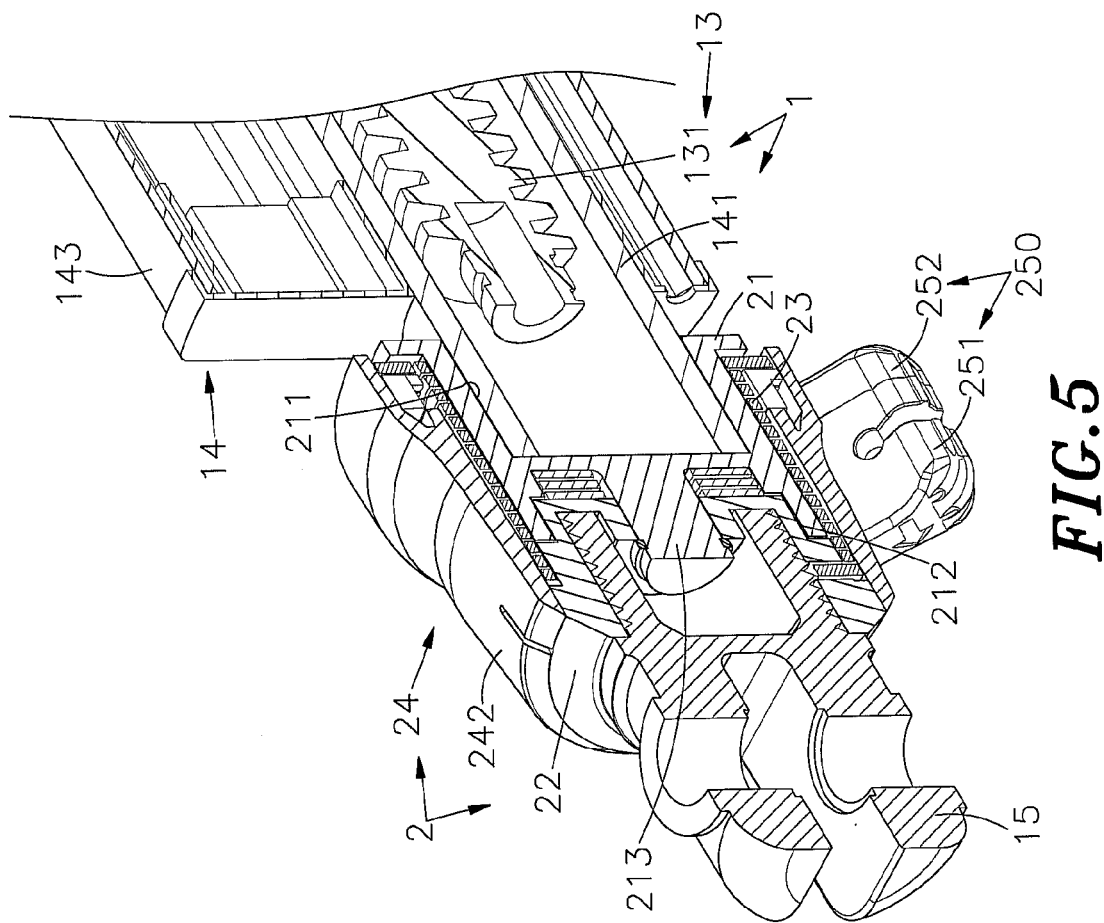
FIG. 5 is a sectional elevation of a part of the electric push rod and release mechanism combination structure in accordance with the present invention.

Referring to FIGS. 1~5, an electric push rod and release mechanism combination structure in accordance with the present invention is shown comprising an electric push rod assembly 1 and a release mechanism 2.

The electric push rod assembly 1 comprises a housing 11 having an accommodation chamber 10 defined therein, a reducing gear set 111 accommodated in the accommodation chamber 10 of the housing 11, a drive unit 12 comprising a motor 121 connected to the housing 11 and a threaded driving shaft 122 extending out of the motor 121 into the inside of the housing 11 and meshed with the transmission gear set 13 for enabling the reducing gear set 111 to be rotated by the motor 121, a transmission device 13 comprising a transmission screw rod 131 coupled to and rotatable by the reducing gear set 111, a retractable tube set 14 mounted on the transmission screw rod 131 of the transmission device 13 and retractable linearly relative to the housing 11 upon rotation of the transmission screw rod 131, and a coupling 15 disposed at an outer side relative to the retractable tube set 14 and remote from the housing 11.

The retractable tube set 14 comprises an outer tube 143 affixed to the housing 11, a nut 142 threaded onto the transmission screw rod 131 of the transmission device 13 and axially slidably coupled to the inside wall of the outer tube 143 by coupling means (not shown; for example, a sliding rail and a sliding groove), and an inner tube 141 fixedly connected to the nut 142 and suspending around the transmission screw rod 131 of the transmission device 13 and movable with the nut 142 in and out of the outer tube 143 upon rotation of the transmission screw rod 131 of the transmission device 13.

The release mechanism 2 is connected between the retractable tube set 14 and coupling 15 of the electric push rod assembly 1, comprising a mounting socket 21, a connection socket 22, a torsion spring 23, a clutch module 24 and an operating device 25. The mounting socket 21 comprises a mounting hole 211 located a rear side thereof and fastened to the distal end of the inner tube 141 of the retractable tube set 14, an open chamber 212 located on a front side thereof for receiving the connection socket 22, a rod member 213 axially suspending in the open chamber 212, and a cushion ring 214 mounted on the rod member 213 and attached to the bottom wall of the open chamber 212 for the purposes of friction reduction and noise elimination. The connection socket 22 is movably received in the open chamber 212 of the mounting socket 21 and connectable to the coupling 15. The torsion spring 23 is mounted around the mounting socket 21 and the connection socket 22, having two end pieces 231 respectively located on the two distal ends thereof. One end piece 231 of the torsion sprig 23 is fastened to a retaining groove 221 at the connection socket 22.

The clutch module 24 comprises a first ring member 241 having an actuation portion 2411 formed of grooves, teeth or protruding blocks at the periphery thereof and a retaining notch 2412 for securing the other end piece 231 of the torsion spring 23, a second ring member 242 movably capped onto the first ring member 241 and having a side opening 244 cut through the periphery thereof, a lug 243, which is a smoothly arched hollow member formed integral with the periphery of the second ring member 242 around the side opening 244 and defining a pivot hole 245 in communication with the side opening 244, an engagement means formed of a series of teeth (or recessed holes) 2441 at the border edge of one side thereof and an arched locating groove 2442 located on the opposite side thereof around the pivot hole 245, and a stop member 246 connected to the lug 243. The stop member 246 can be formed integral with the lug 243 at the second ring member 242. Alternatively, the stop member 246 can be an independent member separately made and then fastened to the lug 243 at the second ring member 242. According to this embodiment, the stop member 246 is an independent member angularly adjustably fastened to the lug 243 at the second ring member 242. As illustrated, the stop member 246 comprises an engagement portion 2461 disposed at one lateral side of one end thereof and detachably engaged with the series of teeth (or recessed holes) 2441 at the lug 243, and a countersunk hole 2462 disposed at the opposite lateral side of the same end thereof and kept in communication with the arched locating groove 2442. Further, a tightening up screw 2463 is threaded into the countersunk hole 2462 and tightly engaged into the arched locating groove 2442 to lock the stop member 246 to the lug 243. It is to be understood that any of a variety of other fastening devices may be selectively used to substitute for the tightening up screw 2463 for affixing the stop member 246 to the lug 243.

The operating device 25 is pivotally connected to the lug 243 at the second ring member 242, comprising an operating handle 250, which can be made in an one-piece form, or, as shown in this embodiment, consists of a first handle member 251 and a second handle member 252, a driving member 254 and a spring member 255. The first handle member 251 comprises a first mounting screw hole 2511 transversely disposed at a proximal end thereof, a transverse axle 253 perpendicularly extended from a distal end thereof and inserted into the pivot hole 245 of the lug 243, and a second mounting screw hole 2531 axially formed in the transverse axle 253. The second handle member 252 comprises a retaining block 2523 located on a distal end thereof, a first countersunk hole 2521 transversely disposed at a proximal end thereof, and a second countersunk hole 2524 transversely disposed at the distal end and cut through the retaining block 2523. The driving member 254 is accommodated in the side opening 244 within the lug 243, comprising a non-circular locating hole 2541 pressfitted onto the non-circular periphery of the transverse axle 253 of the first handle member 251, engagement means, for example, a series of teeth 2542 meshed with the actuation portion 2411 of the first ring member 241, and a pin hole 2543 disposed adjacent to the non-circular locating hole 2541. The spring member 255 is stopped at one side of the driving member 254 around the non-circular locating hole 2541, having two opposite end portions 2551 thereof respectively fastened to the pin hole 2543 of the driving member 254 and a locating block 2443 in the side opening 244 inside the clutch module 24 (see FIG. 6). Further, two mounting screws 2522 and 2525 are respectively mounted in the first countersunk hole 2521 and second countersunk hole 2524 of the second handle member 252 and fastened to the first mounting screw hole 2511 and second mounting screw hole 2531 of the first handle member 251 to affix the first handle member 251 and the second handle member 252 together. Thus, the user can bias the operating device 25 to rotate the first ring member 241 relative to the second ring member 242 and the lug 243 and stopped at the stop member 246.

During installation, the release mechanism 2 is set between the retractable tube set 14 and coupling 15 of the electric push rod assembly 1 to let the mounting hole 211 of the mounting socket 21 be fastened to the distal end of the inner tube 141 of the retractable tube set 14 and the connection socket 22 be connected to the coupling 1.

Figure 6:
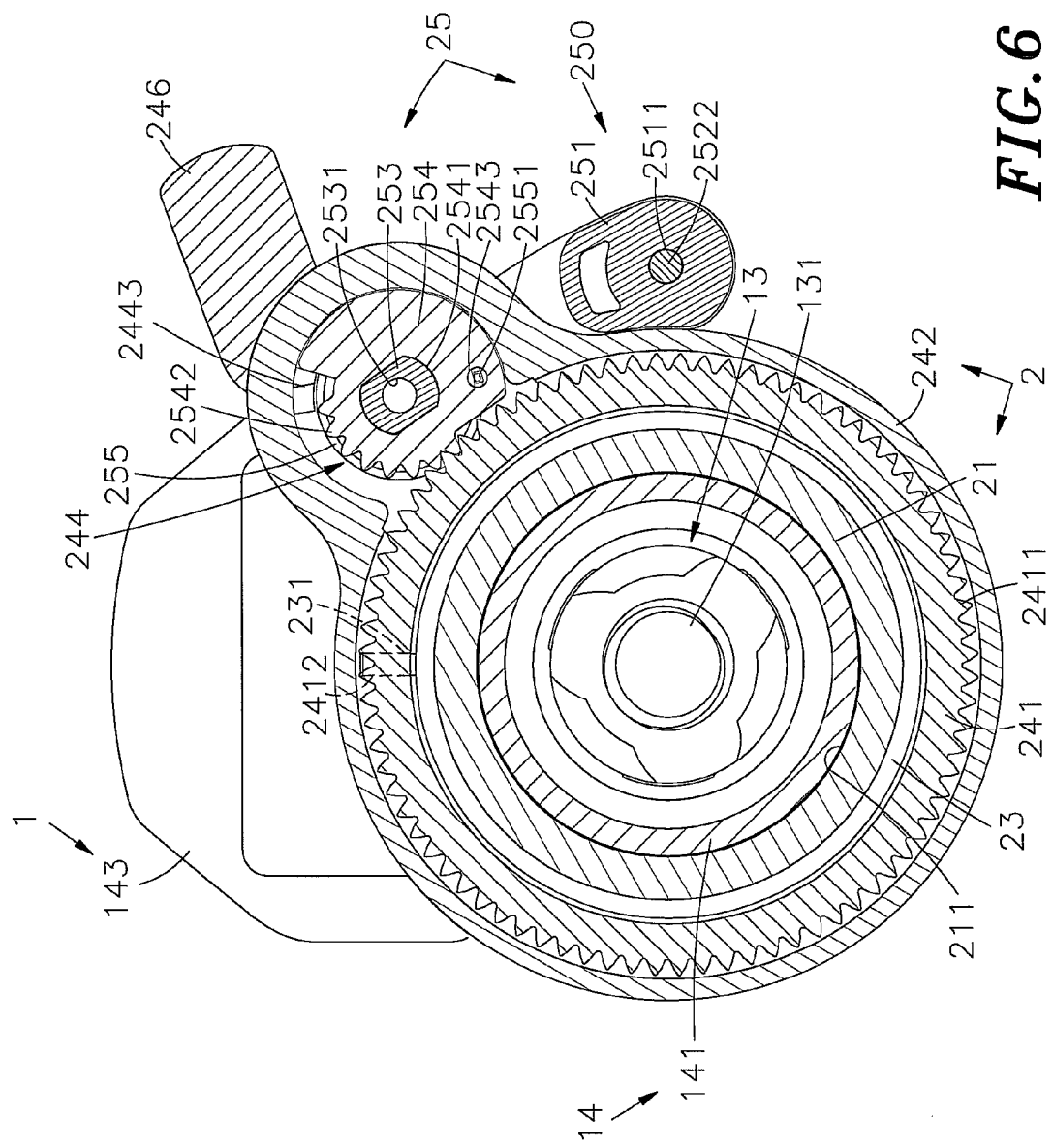
FIG. 6 is a schematic sectional front view of the release mechanism of the electric push rod and release mechanism combination structure in accordance with the present invention.
Figure 7:
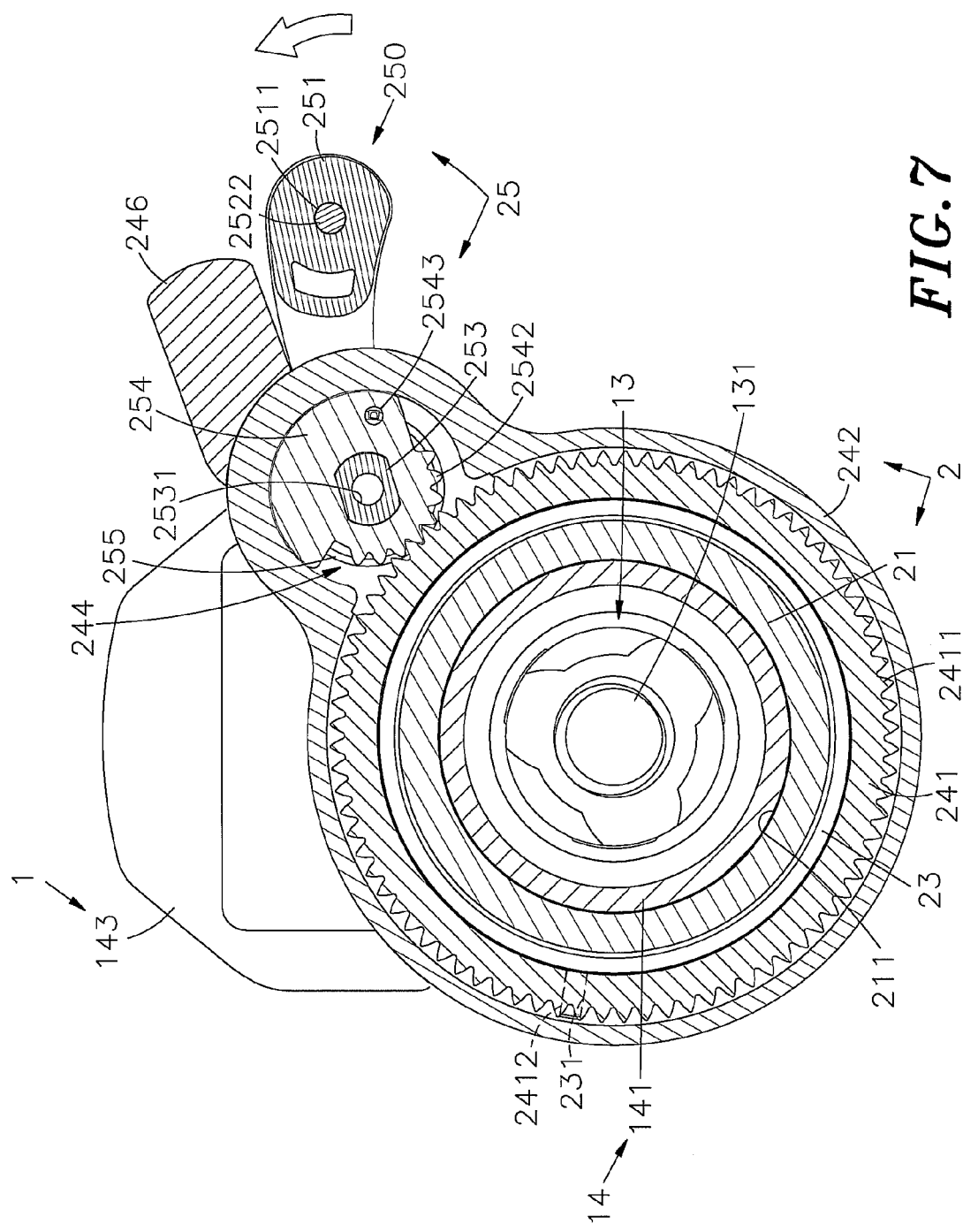
FIG. 7 corresponds to FIG. 6, illustrating the operating device operated.
Figure 8:
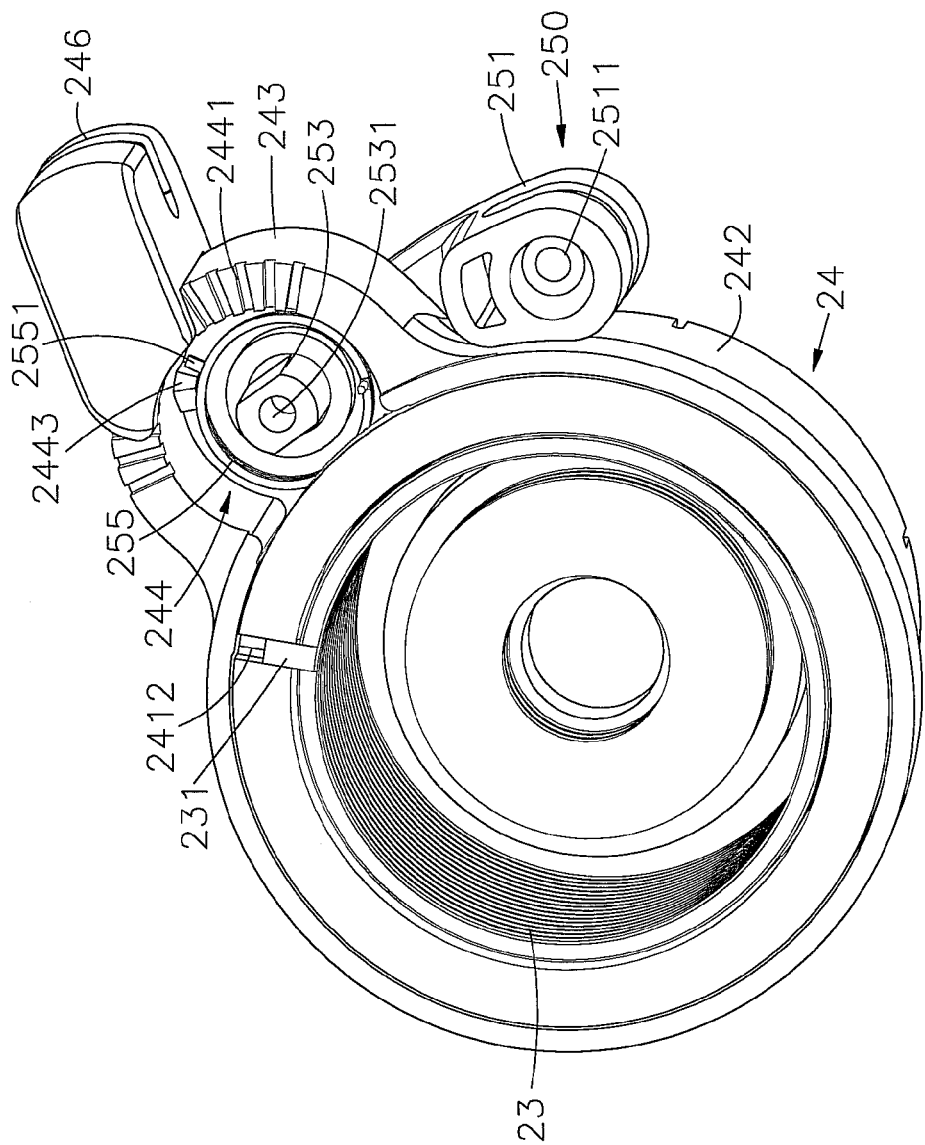
FIG. 8 is an elevational front view of the electric push rod and release mechanism combination structure in accordance with the present invention.
Figure 9:
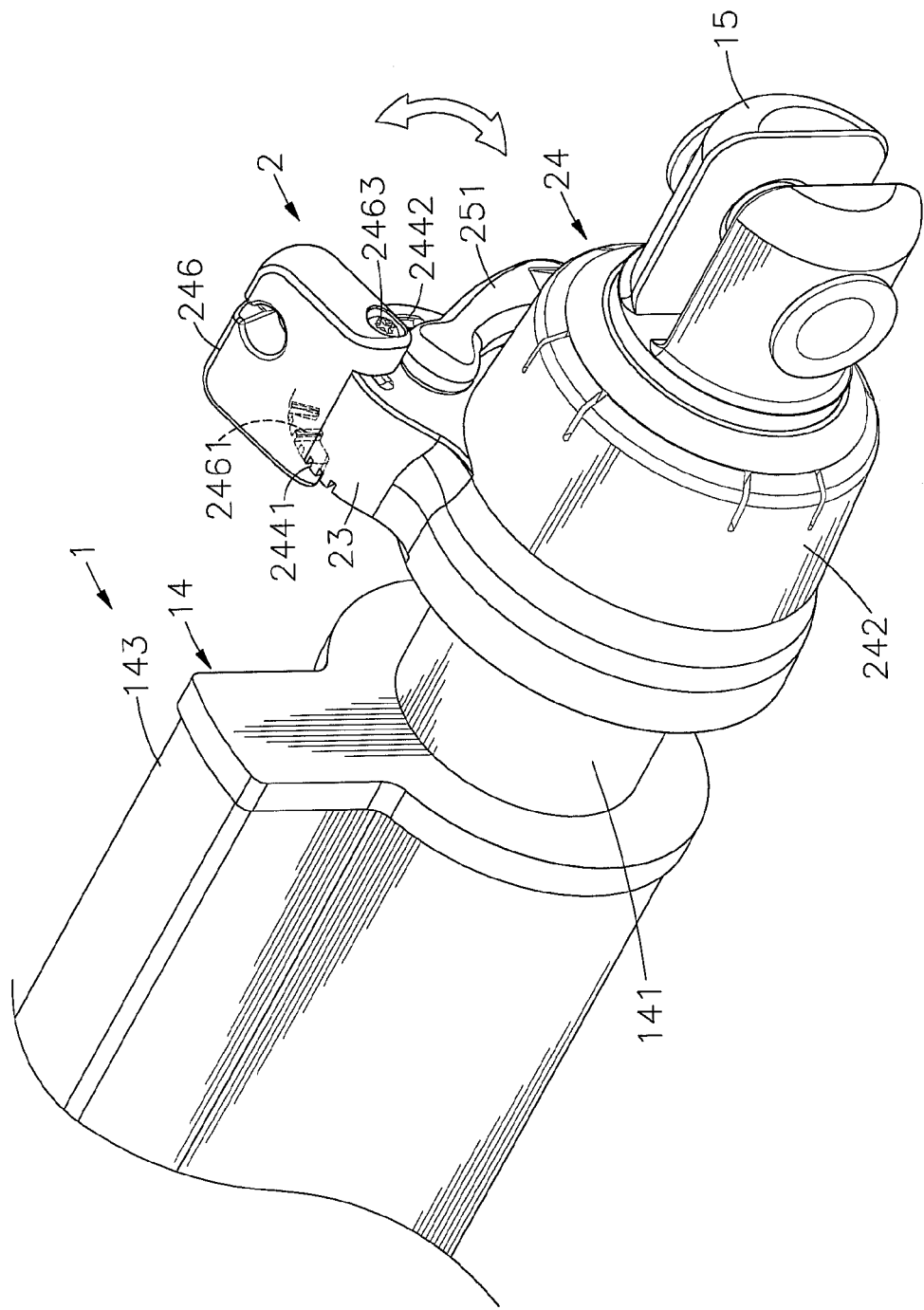
FIG. 9 is an oblique front elevation of the electric push rod and release mechanism combination structure in accordance with the present invention.
Figure 10:
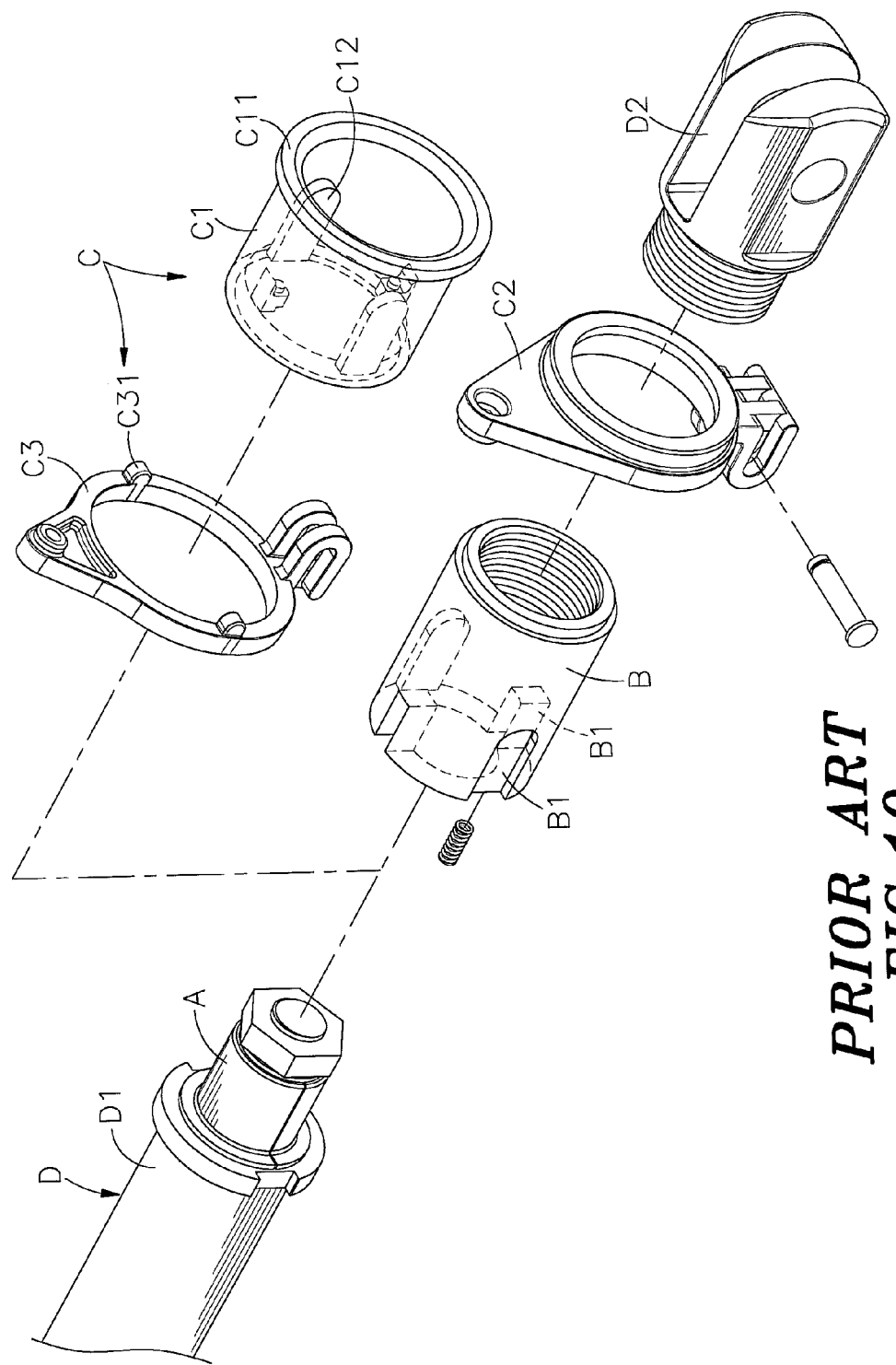
FIG. 10 is an exploded view of an electric push rod release control mechanism according to the prior art.

Referring to FIGS. 6~8 and FIGS. 2,3 and 4 again, during application of the present invention, the electric push rod and release mechanism combination structure is installed in an external equipment (such as electric bed, hospital bed, massage chair, physical therapy equipment, lifting machine, etc.), and the coupling 15 at one end of the electric push rod assembly 1 and the mounting member (not shown) at the other end of the electric push rod assembly 1 are fixedly fastened to the links or movable frame parts of the external equipment with screws or by welding techniques.

As the inner diameter of the torsion spring 23 is smaller than the outer diameter of the mounting socket 21 and the outer diameter of the connection socket 22 before mounting, the torsion spring 23 is firmly secured to the mounting socket 21 and the connection socket 22 after mounting, enhancing friction resistance between the mounting socket 21 and the connection socket 22 and prohibiting the retractable tube set 14 from rotation. Thus, the motor 121 can positively rotate the reducing gear set 111 and the transmission screw rod 131 of the transmission device 13 by means of the threaded driving shaft 122 to move the inner tube 141 with the nut 142 in and out of the outer tube 143, forcing the coupling 15 to change the elevation or angle of the links or movable frame parts of the external equipment.

When the user biases the operating handle 250 of the operating device 25 to rotate the transverse axle 253 in the pivot hole 245 of the second ring member 242, the series of teeth 2542 of the driving member 254 is forced to move the actuation portion 2411 of the first ring member 241, causing the other end piece 231 of the torsion spring 23 that is fastened to the retaining notch 2412 of the first ring member 241 to be moved with the first ring member 241 relative to the end piece 231 of the torsion sprig 23 that is fastened to the retaining groove 221 at the connection socket 22, and therefore the torsion spring 23 is expanded to release the mounting socket 21. Thus, when the external equipment pushes the coupling 15 subject to its gravity weight or an external force at this time, the mounting socket 21 is forced to move the inner tube 141 and the nut 142 along the transmission screw rod 131 toward the inside of the outer tube 143, allowing the links or movable frame parts of the external equipment (electric bed, hospital bed, massage chair, physical therapy equipment, lifting machine, etc.) to be lowered during an emergency condition, enhancing the level of safety.

Referring to FIGS. 8 and 9 and FIGS. 2~4 again, when the user holds the stop member 246 and the operating handle 250 of the operating device 25 with two fingers, the stop member 246 protects the operating device 25 against accidental impact of an external force and increases the torque, enabling the user to bias the operating handle 250 toward the stop member 246 with less effort. By means of using the stop member 246 to stop the operating device 25, the biasing angle of the operating handle 250 is controlled. Thus, the clutch module 24 can be adjusted to control the binding force imparted by the torsion spring 23 to the electric push rod 1 subject to the weight of the person or load carried on the external equipment.

When going to adjust the biasable range of the operating device 25 relative to the stop member 246, use a hand tool (for example, screwdriver) to loosen the tightening up screw 2463 from the arched locating groove 2442, and then move the stop member 246 transversely relative to the lug 243 to disengage the engagement portion 2461 from the series of teeth 2441 at the lug 243, and then bias the stop member 246 relative to the lug 243 to the desired angle, and then move the stop member 246 transversely in the reversed direction to force the engagement portion 2461 into engagement with the series of teeth 2441 at the lug 243 again, and then fasten up the tightening up screw 2463 to lock the stop member 246 to the lug 243. By means of adjusting the angular position of the stop member 246 relative to the lug 243, the biasable range of the operating device 25 relative to the stop member 246 is relatively controlled.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An electric push rod and release mechanism combination structure, comprising:
an electric push rod assembly, said electric push rod comprising a housing having an accommodation chamber defined therein, a reducing gear set accommodated in said accommodation chamber of said housing, a drive unit adapted for rotating said reducing gear set, a transmission device, said transmission device comprising a transmission screw rod coupled to and rotatable by said reducing gear set, a retractable tube set mounted on said transmission screw rod and retractable linearly relative to said housing upon rotation of said transmission screw rod, and a coupling disposed at an outer side relative to said retractable tube set; and
a release mechanism connected between said retractable tube set and said coupling of said electric push rod assembly, said release mechanism comprising a mounting socket, a connection socket, a torsion spring, a clutch module and an operating device, said mounting socket being fastened to a distal end of an inner tube of said retractable tube set remote from said nut, said connection socket being movably received in said mounting socket and connectable to said coupling, said torsion spring being mounted around said mounting socket and said connection socket to hold down said mounting socket and said connection socket, said clutch module being mounted on said mounting socket, said clutch module comprising a first ring member rotatable to expand said torsion spring and to further release said mounting socket and said connection socket from the constraint of said torsion spring, said first ring member comprising an actuating portion, a second ring member movably capped onto said first ring member, said second ring member having a side opening, a lug fixedly located on the periphery of said second ring member around the side opening of said second ring member, said operating device comprising an operating handle pivotally connected to said lug and a driving member suspending in said side opening inside said lug and connected to said operating handle and engaged with said actuation portion of said first ring member and movable by said operating handle to rotate said first ring member, and a stop member adapted for limiting the angle of rotation of said operating device relative to said second ring member and said lug.

2. The electric push rod and release mechanism combination structure as claimed in claim 1, wherein said drive unit comprises a motor connected to said housing, and a threaded driving shaft extending out of said motor into the inside of said housing and meshed with said transmission gear set for enabling said reducing gear set to be rotated by said motor.

3. The electric push rod and release mechanism combination structure as claimed in claim 1, wherein said retractable tube set comprises an outer tube affixed to said housing, a nut threaded onto said transmission screw rod of said transmission device and axially slidably coupled to an inside wall of said outer tube, and an inner tube fixedly connected to said nut and suspending around said transmission screw rod of said transmission device and movable with said nut in and out of said outer tube upon rotation of said transmission screw rod of said transmission device.

4. The electric push rod and release mechanism combination structure as claimed in claim 1, wherein said mounting socket comprises a mounting hole located a rear side thereof and fastened to the distal end of said inner tube of said retractable tube, and an open chamber located on a front side thereof for receiving said connection socket.

5. The electric push rod and release mechanism combination structure as claimed in claim 1, wherein said connection socket comprises a retaining groove; said first ring member comprises a retaining notch; said torsion spring comprises two end pieces respectively located on two distal ends thereof and respectively fastened to the retaining groove of said connection socket and the retaining notch of said first ring member.

6. The electric push rod and release mechanism combination structure as claimed in claim 1, wherein said lug is an arched hollow member comprising a transversely extending pivot hole; said operating handle comprises a first handle member and a second handle member, said first handle member comprising a transverse axle perpendicularly extended from a distal end thereof and inserted into the pivot hole of said lug, said second handle member has one end thereof connected to said transverse axle of said first handle member; said driving member is mounted on said transverse axle of said first handle member and rotatable with said first handle member and said second handle member.

7. The electric push rod and release mechanism combination structure as claimed in claim 1, wherein said driving member comprises a series of teeth meshed with said actuation portion of said first ring member, and a pin hole; said lug further comprises a locating block suspending in said side opening of said second ring member; said operating device further comprising a spring member stopped at one side of said driving member, having two opposite end portions thereof respectively fastened to said pin hole of said driving member and said locating block of said lug.

8. The electric push rod and release mechanism combination structure as claimed in claim 1, wherein said actuation portion of said first ring member is formed of a series of teeth; said driving member comprises a series of teeth engaged with said series of teeth of said actuation portion of said first ring member.

9. The electric push rod and release mechanism combination structure as claimed in claim 1, wherein said lug comprises engagement means disposed at a border edge of one side thereof, an arched locating groove located on an opposite side thereof; said stop member comprises an engagement portion disposed at one lateral side of one end thereof and detachably engaged with the series of teeth of said lug, a countersunk hole disposed at an opposite lateral side of the same end thereof and kept in communication with said arched locating groove of said lug, and a tightening up screw threaded into said countersunk hole and tightly engaged into said arched locating groove to lock said stop member to said lug.

10. The electric push rod and release mechanism combination structure as claimed in claim 9, wherein said engagement portion of said stop member is a toothed block; the engagement means of said lug is a series of recessed holes selectively engaged with the toothed block of said engagement portion of said stop member.

* * * * *